United States Patent [19]

Kohut

[11] Patent Number: 4,784,358
[45] Date of Patent: Nov. 15, 1988

[54] CABLE STRAP

[75] Inventor: James K. Kohut, Northville, Mich.

[73] Assignee: Chrysler Motors Corporation, Highland Park, Mich.

[21] Appl. No.: 105,419

[22] Filed: Oct. 7, 1987

[51] Int. Cl.$^4$ .............................................. F16L 3/08
[52] U.S. Cl. ..................................... 248/74.3; 248/71; 248/73; 24/16 PB; 24/20 TT
[58] Field of Search .................... 248/74.3, 74.1, 74.2, 248/73, 71; 24/20 TT, 16 PB; 285/903

[56] References Cited

U.S. PATENT DOCUMENTS

| | | | |
|---|---|---|---|
| 2,936,980 | 5/1960 | Rapata | 248/74 |
| 3,302,913 | 2/1967 | Collyer et al. | 248/74.3 X |
| 3,471,109 | 10/1969 | Meyer | 248/74.3 X |
| 3,667,710 | 6/1972 | Moody et al. | 248/71 |
| 3,758,060 | 9/1973 | Schuplin | 248/74.3 |
| 4,272,047 | 6/1981 | Botka | 248/74.3 |
| 4,272,870 | 6/1981 | McCormick | 248/74.3 X |
| 4,490,886 | 1/1985 | Omata | 248/74.3 X |
| 4,490,887 | 1/1985 | Sarton et al. | 248/74.3 X |
| 4,501,049 | 2/1986 | Adamson | 24/16 PB X |
| 4,669,688 | 6/1987 | Itoh et al. | 248/74.3 X |

Primary Examiner—Ramon O. Ramirez
Attorney, Agent, or Firm—Edward A. Craig

[57] ABSTRACT

A cable strap is provided for securing a cable to a panel. The cable includes a tubular sheath having longitudinally spaced apart annular grooves on the outer surface thereof. The cable strap comprises a flexible strap having a buckle at one end for reception of the other end of the strap to secure the cable strap to the cable. A fastener is provided on the outer surface of the strap for securement to a panel. Teeth are provided on the inner surface of the strap to engage the tubular sheath and prevent rotation or movement longitudinally of the sheath with respect to the cable strap.

2 Claims, 2 Drawing Sheets

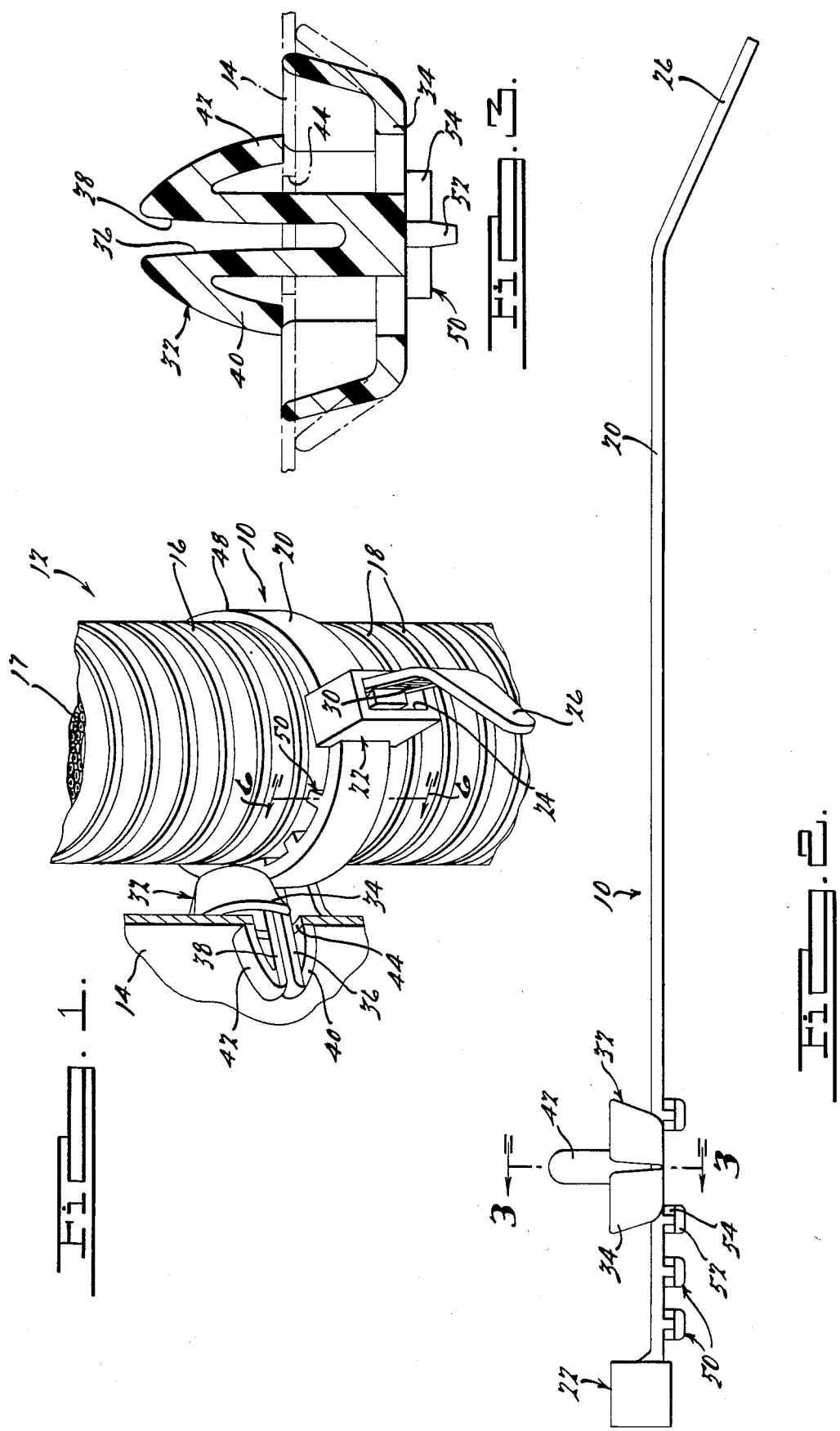

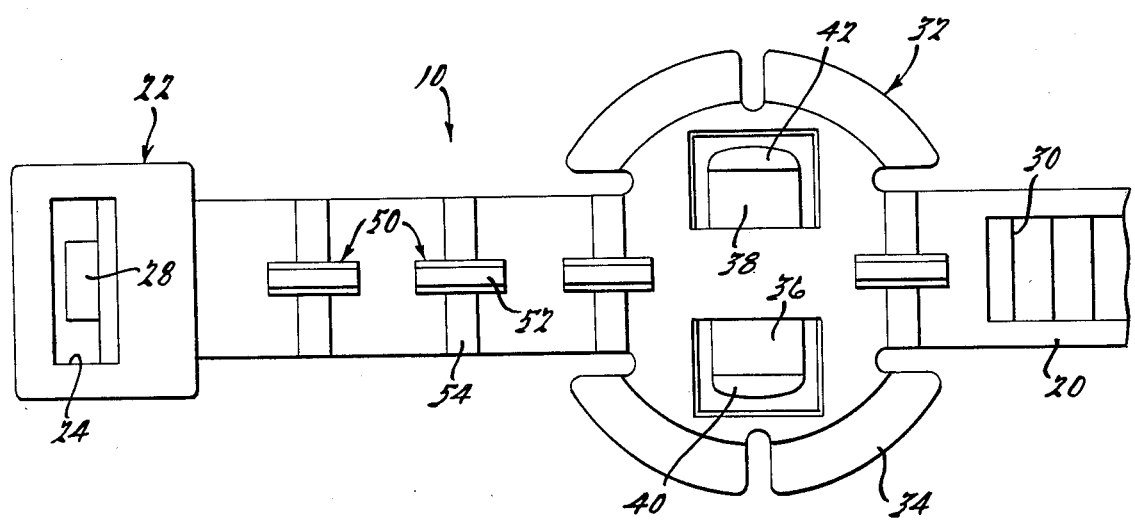
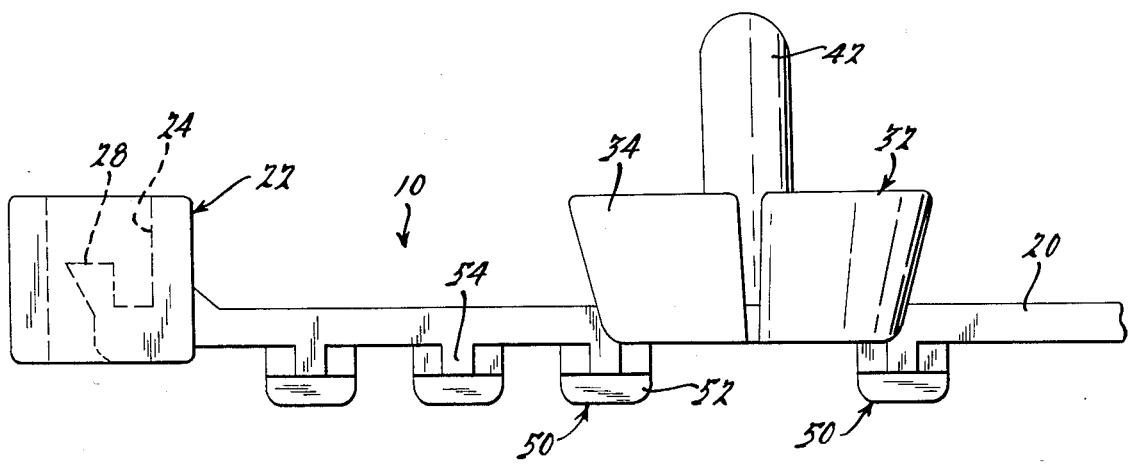
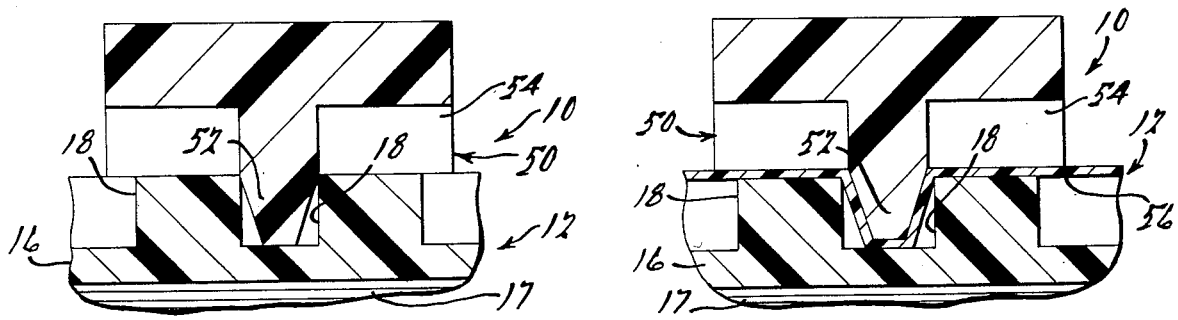

CABLE STRAP

BACKGROUND OF THE INVENTION

1. Field Of the Invention:

A cable strap is provided for securing a cable to a panel. The cable strap includes teeth to prevent rotation or longitudinal movement of the cable within the strap.

2. Prior Art:

Cable straps of the type to which the present invention pertains are in common usage, particularly in the automotive industry where it is necessary to secure electrical cables in place. Such electrical cables commonly form portions of wiring harnesses which are preassembled and then mounted in vehicles during assembly of the vehicles. Examples of prior art cable straps are disclosed in U.S. Pat. Nos. 2,936,980, Rapata; 3,471,109, Meyer; 3,667,710, Moody et al and 4,490,886, Omata. Generally, such cable straps include a flexible strap portion having a buckle at one end. The strap portion is flexible and is wrapped around a cable or bundle of wires with one end of the strap being received in a slot in the buckle. Normally, the buckle is provided with a pawl in the slot which engages serrations or teeth on the inner face of the strap with the result that once the strap is inserted into the buckle slot, the strap is permanently engaged and will not come apart. The strap is normally provided with some type of fastening device for securement to a panel, such as a sheet metal panel of a vehicle. The strap is fastened in place on the panel thereby retaining the cable in the desired position.

One problem which has been encountered in connection with prior art cable straps is that the straps do not sufficiently engage the cable so as to prevent slippage of the strap along the cable or turning of the cable within the strap. It is important in vehicle assembly operations that the cable strap be exactly located on the cable both with respect to the length of the cable and with respect to the circumference of the cable so that when the fastener is secured to the panel, it will be exactly where it is supposed to be for securement. It will be understood that the wiring harness, including the cable strap, is ordinarily preassembled as above mentioned. Therefore, it is possible for the strap to move with respect to the cable during handling operations subsequent to preassembly of the wiring harness and installation on a vehicle.

The present invention resolves this problem by providing teeth on the cable strap which engage annular grooves on the cable sheath and also the surface of the cable sheath to prevent undesired longitudinal movement or turning movement of the cable with respect to the cable strap.

SUMMARY OF THE INVENTION

A cable strap is provided for securing a cable to a panel. The cable includes a tubular sheath having longitudinally spaced apart annular grooves on the outer surface thereof. The cable strap comprises a flexible strap having a buckle on one end. The buckle has a slot for insertion and retention of the other end of the strap with the strap wrapped around the cable. A fastener is provided on the outer surface of the strap and is insertable through an opening in the panel for securement of the strap to the panel. The fastener is located adjacent to but spaced from the buckle.

A plurality of spaced apart teeth are provided on the inner surface of the strap. At least some of the teeth are positioned between the buckle and the fastener. Portions of the teeth are receivable in an annular groove when the strap is wrapped around a cable to thereby prevent the cable from slipping through the strap.

The portion of each tooth which is receivable in an annular groove extends transversely of the strap. Each tooth has an additional portion which extends longitudinally of the strap. The first mentioned tooth portion extends further outwardly from the strap than the second mentioned portion whereby the first mentioned portion is receivable in an annular groove with the second mentioned portion pressing against the outer surface of the tubular sheath to inhibit turning of the tubular within the cable strap.

Preferably no teeth are provided on the strap on the inner surface of the strap opposite from the fastener thereby permitting the strap to bend in the area of the fastener.

DESCRIPTION OF THE DRAWINGS

FIG. 1 is a perspective view of one embodiment of the cable strap of the present invention illustratively wrapped around a cable and fastened to a panel;

FIG. 2 is a side-elevational view of the cable strap;

FIG. 3 is a sectional view taken substantially along the line 3—3 of FIG. 2 looking in the direction of the arrows;

FIG. 4 is a plan view of one end of the cable strap illustrating the underside thereof to show the teeth which secure the cable strap in place on a cable;

FIG. 5 is a side-elevational view of one end of the cable strap;

FIG. 6 is a sectional view taken substantially along the line 6—6 of FIG. 1 looking in the direction of the arrows; and FIG. 7 is a view similar to FIG. 6 illustrating the use of adhesive tape to provide an improved gripping surface or the teeth of the cable strap.

DETAILED DESCRIPTION OF A PREFERRED EMBODIMENT

Referring to FIG. 1, it will be noted that the cable strap 10 is wrapped around a cable 12 and is secured to a panel 14. The cable includes a tubular sheath 16 having longitudinally spaced apart annular grooves 18 on the outer surface thereof. The sheath 16 is fabricated of, for example, a plastic material such as nylon. It encloses a bundle of electrical wires 17 which normally form part of a wiring harness for a vehicle. The sheath 16 is of the type commonly referred to as convolute, the annular grooves 18 permitting bending of the sheath as necessary.

The cable strap 10 includes a flexible strap portion 20 which may be fabricated of, for example, a heat resistant nylon. A buckle 22 is provided on one end of the strap portion 20. The buckle has a slot 24 for insertion and retention of the other end 26 of the strap portion 20. As will be noted, the end 26 is permanently bent at an angle with respect to the main body of the strap. The angle may be, for example, about 25 degrees. This permits easy insertion of the end 26 into the slot 24 and the end 26 also serves as a tab for pulling. The slot 24 has a pawl 28 provided therein. Serrations 30 are provided on the underside of the strap portion 20 as may best be seen in FIG. 4. Upon insertion of the end 26 into the slot 24, the pawl 28 engages the serrations 30 thus preventing the strap portion 20 from being pulled out of the buckle after it has been wrapped around a cable 12 as shown in FIG. 1. This arrangement results in permanent mounting of the cable strap 10 on the cable 12.

A fastener 32 is provided on the outer surface of the strap. The fastener 32 is illustrated as a type referred to as an arrowhead. As will be noted, it includes a cup-shaped base 34 from within which project a pair of prongs 36, 38. As best noted in FIG. 3, the prongs 36, 38 are spaced apart and thus may be flexed toward each other. Each prong is provided with a rearwardly extending barb 40, 42. The barbs 40, 42 may also be flexed inwardly thus permitting the arrowhead to be forced through an opening 44 in the panel 14 (shown in dotted lines). Once the barbs 40, 42 have passed through the opening 44, they, as well as the prongs, flex outwardly thus preventing removal from the panel 14. The walls of the cup-shaped element 34 press against the reverse surface of the panel 14 and deform (as shown in dotted lines) thus providing a secure attachment to the panel. As will be noted, the fastener 32 is located adjacent to but spaced from the buckle 22. This arrangement permits the fastener 32 to be forced into the opening 44 independently of the buckle area. The manual driving force is applied at 48 thus providing for easy mounting of the cable strap 10 on the panel 14.

A plurality of spaced apart teeth 50 are provided on the inner surface of the strap. The function of the teeth 50 is to grip the tubular sheath 16 and prevent turning of the sheath 16 within the cable strap 10 and also prevent sliding of the cable strap 10 along the sheath. As will be noted in FIGS. 2, 4 and 5 at least some of teeth 50 are positioned between the buckle 22 and the fastener 32. One additional set of teeth 50 is provided on the opposite side of the fastener. Three sets of teeth 50 are provided between the buckle 22 and fastener 32. No teeth are provided opposite the fastener 32. The absence of any teeth on the inner surface of the strap opposite from the fastener 32 permits the strap to be bent or flexed in the area of the fastener 32. The provision of the teeth 50 on the end of the strap adjacent the buckle 22 permits the remaining portions of the strap to be used for wrapping around a cable. If teeth were provided along the entire strap, the strap would not fit through the slot 24 thus preventing the desired engagement with the buckle 22. With the arrangement shown, a maximum length of strap portion 20 is usable for wrapping around cables of different sizes as desired.

As will be noted, each set of teeth 50 has a portion 52 which is receivable in an annular groove 18. The portion 52 extends transversely of the strap portion 20. Each set of teeth 50 has an additional portion 54 which extends longitudinally of the strap portion 20. The portion 52 extends further outwardly from the strap than the portion 54 so that the portion 52 is receivable in an annular groove 18 with the second portion 54 pressing against the outer surface of the tubular sheath 16 to inhibit turning of the tubular sheath within the cable strap. Each tooth portion 52 is formed as a V-shape so that it will be easily insertable into the annular groove 18. As will be appreciated, the portions 52 prevent the cable 12 from slipping through the cable strap 10 when the cable strap is wrapped therearound.

The portions 54 do not have positive engagement with the cable 12 in the sense of lying in a groove. Therefore, in some cases it may be desirable, as shown in FIG. 7, to wrap an adhesive tape 56, which may be a conventional fabric friction type, around the tubular sheath 16. When the cable strap is wrapped around the tubular sheath 16, the teeth portions 52 will drive the tape 56 into the annular grooves 18 as shown in FIG. 7. The portions 54 will press against the tape 56 thereby improving the gripping surface to prevent rotation of the cable 12 within the cable strap 10.

It is very important that the cable strap 10 not move with respect to the cable 12 after it has been mounted on the cable 12. As previously mentioned, the wiring harnesses are preassembled, include positioning of the cable straps 10 on the desired locations. The cable strap 10 should maintain its position until the wiring harness is mounted in the vehicle. If the cable strap should either slide along the cable 12 or turn with respect to it, the fastener 32 would not be in the right location for reception in the opening 44. This would require additional labor to reposition the cable strap and thus lead to inefficient assembly of vehicles.

I claim:

1. In a cable strap for securing a cable to a panel, the cable including a tubular sheath having longitudinally spaced apart annular grooves on the outer surface thereof, the cable strap comprising a flexible strap, a buckle on one end of the strap, the buckle having a slot for insertion and retention of the other end of the strap with the strap wrapped around the cable, a fastener on the outer surface of the strap insertable through an opening in a panel for securing of the strap to the panel, the fastener being located adjacent to but spaced from the buckle, the improvement comprising a plurality of spaced apart teeth on the inner surface of the strap, at least some of the teeth being positioned between the buckle and the fastener, portions of the teeth being receivable in an annular groove when the strap is wrapped around a cable to thereby prevent the cable slipping through the cable strap, the portion of each tooth receivable in an annular groove extending transversely of the strap, each tooth having an additional portion which extends longitudinally of the strap, said first mentioned tooth portion extending further outwardly from the strap than the second mentioned portion whereby the first mentioned portion is receivable in an annular groove with the second mentioned portion pressing against the outer surface of the tubular sheath to inhibit turning of the tubular sheath within the cable strap.

2. A cable strap as in claim 1, further characterized in that no teeth are provided on the strap on the inner surface of the strap opposite from the fastener thereby permitting the strap to bend in the area of the fastener.

* * * * *